United States Patent [19]

Monnier et al.

[11] Patent Number: 5,050,962
[45] Date of Patent: Sep. 24, 1991

[54] DISPLAY DEVICE FOR ERGONOMIC SIGHTS WITH A LARGE FIELD OF OBSERVATION

[75] Inventors: Laurent Monnier, Bordeaux; Jean-Pierre Gerbe, Pessac, both of France

[73] Assignee: Thomson-CSF, Puteaux, France

[21] Appl. No.: 537,805

[22] Filed: Jun. 14, 1990

[30] Foreign Application Priority Data

Jun. 14, 1989 [FR] France ............................... 89 07901

[51] Int. Cl.$^5$ ..................... G02B 27/10; G02B 27/14; G02B 5/32
[52] U.S. Cl. ........................................ 359/13; 359/630
[58] Field of Search ................. 350/174, 3.7, 602, 173, 350/171

[56] References Cited

U.S. PATENT DOCUMENTS

| | | | |
|---|---|---|---|
| 3,942,901 | 3/1976 | Ekstrand | 350/174 |
| 4,081,209 | 3/1978 | Heller et al. | 350/174 |
| 4,761,058 | 8/1988 | Evans et al. | 350/602 |
| 4,775,218 | 10/1988 | Wood et al. | 350/174 |
| 4,830,464 | 5/1989 | Cheysson et al. | 350/174 |
| 4,859,030 | 8/1989 | Rotier | 350/174 |

FOREIGN PATENT DOCUMENTS

| | | |
|---|---|---|
| 77193 | 4/1983 | European Pat. Off. |
| 119128 | 9/1984 | European Pat. Off. |
| 240374 | 10/1987 | European Pat. Off. |
| 288365 | 10/1988 | European Pat. Off. |

Primary Examiner—Jon W. Henry
Attorney, Agent, or Firm—Oblon, Spivak, McClelland, Maier & Neustadt

[57] ABSTRACT

A display device for an ergonomic helmet-mounted sight with a large field of observation, including a collimation and combination optical unit joined to an image generator located on the same side as an observation point relative to the optical unit. The optical unit includes a holographic or dichroic mirror and a semi-transparent plane mirror included in a transparent plate with parallel faces.

3 Claims, 1 Drawing Sheet

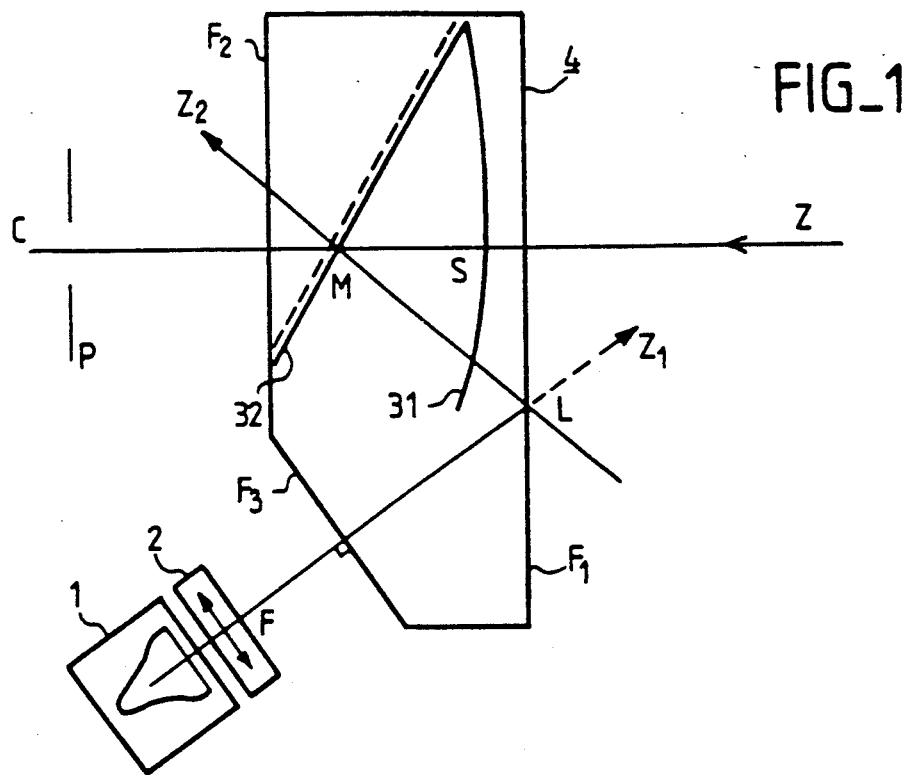
FIG_1
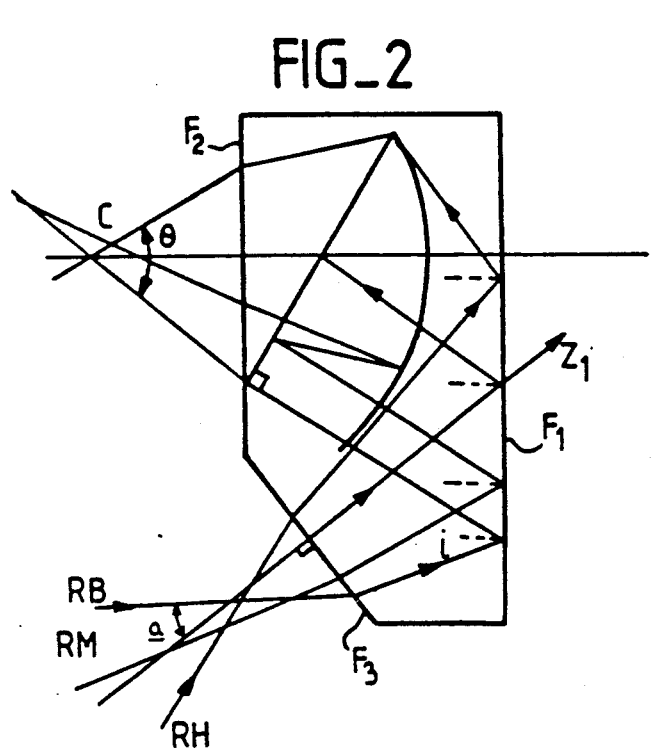
FIG_2
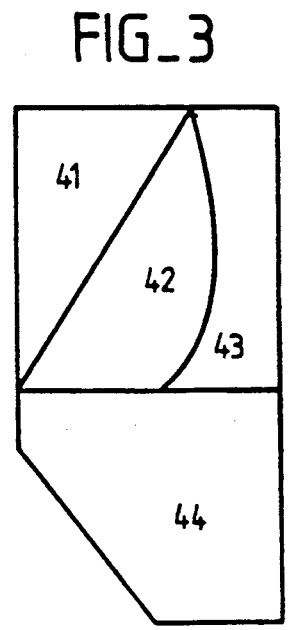
FIG_3

5,050,962

DISPLAY DEVICE FOR ERGONOMIC SIGHTS WITH A LARGE FIELD OF OBSERVATION

BACKGROUND OF THE INVENTION

1. Field of the Invention

The present invention relates to display devices, and in particular, display devices for ergonomic helmet-mounted sights.

2. Discussion of the Background

In helmet-mounted sights, a collimated light image is observed superposed on the view corresponding to the surroundings. A collimating optical system is used to reflect a light image, for example, an image corresponding to the date. The sight avoids excessive exertion of the eye of the observer and therefore provides great visual comfort. In conventional head-up use on board aircraft, the light image is reflected by a combination optical system to the observer. The radiation coming from the surroundings passes through this optical system. Thus the observer sees, in superposition on the surroundings, the collimated light image corresponding, for example, to a synthetic image which shows aerial navigation data.

In published French patent application No. 2,593,932, a display device is disclosed having a collimation and combination optical unit including a holographic spherical mirror used on the axis for observing, from the center of this mirror, a collimated light image, and a semitransparent mirror inclined on said axis corresponding to the normal direction of view for the observation of the superposed collimated image in the surroundings and a generator of the light image to be collimated whose radiation reaches the semitransparent mirror. The semitransparent mirror reflects the radiation to the spherical mirror, on the concave side thereof, when the radiation is reflected to the semitransparent mirror which transmits it in the direction of the observer. This device is characterized in that the radiation of the light images first passes through the spherical mirror on which it falls incident, on the convex side thereof, with an incidence outside of the incidence range for which the mirror is designed to selectively reflect the radiation passing through this spherical mirror in the direction of the semitransparent mirror. The optical unit is placed in a transparent medium forming a plate with parallel faces which constitute a stigmatic system for infinity.

According to 2,593,932, more particularly intended for the production of ergonomic helmet-mounted sights, the image generator and the observation point are placed on the same side relative to the optical unit, and the unit is completed by a reflecting mirror to reflect the radiation from the generator along its optical axis to the convex face of the spherical mirror.

SUMMARY OF THE INVENTION

Accordingly, an object of the present invention is to provide a device for the production of ergonomic helmet-mounted sights with a large field of observation and improved energy efficiency, in which a collimated light image is observed superposed on the view of the surroundings.

Another object of the present invention is to provide an improved display device with a large field of observation field and greater energy efficiency, for use with a helmet-mounted sight, while improving the ergonomics of the system.

A further object of the present invention is to provide a display device for an ergonomic helmet-mounted sight, having a collimation and combination optical unit joined to an image generator located on the same side as the observation point relative to the optical unit, characterized in that the collimation and combination optical unit consists of a holographic or dichroic mirror and a semitransparent mirror included in a transparent plate with parallel faces.

The invention further provides the following important advantages:

the plate with parallel faces includes a beveled surface exhibiting, relative to the rear face of said plate, an inclination such that the light beams emerging from the image generator undergo a total reflection on the rear face; the optical axis of the spherical mirror coincides with the viewing axis; and the plate with parallel faces advantageously consists of four elements of glass or of a transparent organic material, shaped to fit with one another, namely a first element, having one face constituting a lateral face of the plate with parallel faces and another face supporting the plane mirror, a second intermediate element resting on the plane face of the first element and whose other face is of a spherical configuration able to support the spherical mirror, a third element of convex configuration having one face adjacent to the second element and a second planar face corresponding to the second lateral face of the plate with parallel faces, and a fourth element which lengthens the lateral faces of the plate with parallel faces and is beveled on another face to ensure the light beam emerging from the image generator is normally incident upon the plate with parallel faces. According to another characteristic of the invention, these four elements are made of the same transparent material exhibiting suitable characteristics of refraction and mechanical strength for use in helmet-mounted sights.

The improvements contributed by this device during use for the production of ergonomic helmet-mounted sights are better compactness of the system because it has been possible to eliminate an additional reflecting mirror, and greater ease of installation because only a plate with parallel faces is to be provided. Commensurate with these ergonomic improvements is also a better transmission of the surroundings path and the image path.

BRIEF DESCRIPTION OF THE DRAWINGS

FIG. 1 is a diagrammatic view of the display device of the invention;

FIG. 2 is a view illustrating the routing of the radiations in the device of FIG. 1; and FIG. 3 is a diagrammatic view of the plate with parallel faces of the invention.

DESCRIPTION OF THE PREFERRED EMBODIMENT

Referring now to the drawings, wherein like reference characters designate identical or corresponding parts throughout the several views, and more particularly to FIG. 1 thereof, a display device is shown including an imaging unit or image generator 1, joined to a relay optical device 2 intended to make the light image coincide with the focal surface of spherical mirror 31. The collimation and combination optical unit consists of spherical mirror 31 and semitransparent mirror 32. This unit is placed inside a plate 4 with parallel faces F1 and F2. Axis Z1 represents the optical axis of the image generator which corresponds to the center of the light image. Axis Z2 corresponds to the optical axis after total reflection of the light image from face F1 of plate 4 at point L. Axis Z corresponds to the optical axis of spherical mirror 31, which intersects the optical axis of the image generator after reflection from face F1 at point M on the semitransparent mirror 32, and also corresponds to the normal direction of view for an observer placed at C, at the center of spherical mirror 31. It will be noted that the lower zone of plate 4 is beveled to form a plane zone F3 inclined relative to face F1, to be orthogonal to axis Z1 and to ensure the total reflection from face F1.

The observer has been shown by observation pupil P. Optical path SC corresponds to ray of length R from the spherical mirror whereas path SM+ML+LF corresponds to the focal distance from the spherical mirror, i.e., R/2. The use of spherical mirror 31 on axis Z limits aberrations while making it possible to considerably increase the field of observation. The energy efficiency is further increased by making a holographic or dichroic selection of the two paths (selection on the wavelength and on the angle of incidence).

Referring more particularly to FIG. 2, angle $\ominus$ represents the on-site instantaneous field of vision of the collimated light image. Angle a represents approximately the limiting value of low ray RB relative to axis Z1 of the image generator. Actually, ray RB is normally incident upon plane mirror 32 and returns to the image generator. Light traveling along axis Z1 is normally incident on input face F3 of plate 4 and does not undergo angular deviation in traveling through plate 4. The angles of incidence of the incident rays on face F1 of plate 4 are greater than the critical angle for total reflection. The lower limit of observation therefore is determined for angle of field $\ominus$, or either by angle a corresponding to the effective band of incidence of the hologram or dichroism 31, or by angle i which limits the total reflection.

The optical paths are shown for low rays RB and for high rays RH and for any ray RM illustrating the general path between the elements of the collimation and combination optical unit. It will be noted that the diagram is not drawn to scale and that the angles of refraction are not critical.

The hologram or the dichroism placed on spherical diopter 31 is effective for the spectral band of the light rays of the image-generating device. It can correspond to a narrow band located in the green region. The conditions on the angle of incidence ranges are such that when the radiation reaches the convex side of spherical mirror 31, the radiation should pass through, the limiting values of incidence under these conditions determining a first range, and such that after reflection by the semitransparent plane mirror, the radiation reaches the concave side of spherical mirror 31, the spherical mirror selectively reflecting so as to determine a second range. These two ranges of angle of incidence are distinct. Thus, the hologram or the dichroism will be effective only in the range of incidence selected for the reflection and for the spectral band corresponding to the image generator.

From an energy viewpoint, there is no loss from the total reflection, and the radiation from the surroundings passes through mirror 31 almost entirely, with the exception of the radiation included in the spectral band selected for the reflection, the radiation from the image generator being almost totally reflected by spherical mirror 31. Consequently, only the losses of semitransparent mirror 32 are to be taken into account. Actually, the image radiation is first reflected then passes through mirror 32 after reflection in mirror 31, and the radiation from the surroundings is partially eliminated by reflection during the passage of mirror 32. The system nevertheless has a very good energy efficiency since it makes it possible to obtain up to 25% of energy transmission on the image path and on the order of 45% on the surroundings path.

Referring more particularly to FIG. 3, it is seen that plate 4 consists of four elements of glass or of a transparent organic material, which are shaped to closely fit with one another. Numerical reference 41 represents a first element having a first face which constitutes a lateral face (F2) of plate 4 and a second face which supports semitransparent plane mirror 32. Adjacent to the second face of element 41, a second intermediate element 42 is disposed having a spherical face formed by machining which supports mirror 31. An element 43 contains a machined concave face disposed opposite the spherical face of element 42 and a second planar face corresponding to the second lateral face (F1) of plate 4. A fourth element 44 extends the lateral faces F1 and F2 of plate 4 and is beveled on one face such that axis Z1 is normally incident thereupon. The four elements advantageously are made of the same transparent material.

The light radiation of the image enters the transparent medium provided by plate 4 in which the semitransparent mirror 32 as well as the holographic or dichroic spherical mirror 31 are included, reflects on a planar face of the medium (F1) by total reflection, i.e., without energy loss, passes through the spherical mirror 31 on which it falls incident, on the convex side thereof, outside of the reflection range of incidence, reaches the semitransparent mirror 32, which reflects it to the spherical mirror 31 on the concave side thereof, the spherical mirror 31 again reflecting it to the semitransparent mirror 32 which transmits it in the direction of the observer. Finally, the radiation exits the transparent medium from face F2 before arriving in the eye of the observer. Advantageously, the transparent medium consists of a plate with parallel faces, which constitutes a stigmatic system with an infinite focal length.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A display device for an ergonomic helmet-mounted sight with a large field of observation, comprising:
    a collimation and combination optical unit joined to an image generator located on the same side as an observation point relative to the optical unit, said collimation and combination optical unit comprising a transparent plate having parallel front and rear faces, and a beveled surface exhibiting, relative to said rear face, an inclination such that radiation emerging from the image generator undergoes total reflection on said rear face, wherein said plate comprises:

a first element having a first face forming a portion of said front face of said plate and a planar second face supporting a semitransparent planar mirror;

a second element disposed adjacent to said planar second face of said first element and having a face of spherical configuration which supports a holographic or dichroic mirror;

a third element having a concave first face disposed adjacent to said spherical face of said second element and having a planar second face forming a portion of said rear face of said plate; and a fourth element formed between remaining portions of said parallel front and rear faces of said plate and said beveled surface.

2. A display device according to claim 1, wherein said plate further comprises:

glass or a transparent material having suitable characteristics of refraction and mechanical strength.

3. A display device according to claim 1 comprising:

an optical axis of said holographic or dichroic mirror coinciding with a viewing axis.

* * * * *